Dec. 24, 1935.     O. F. LUNDELIUS ET AL     2,025,669
DIFFERENTIAL AND SPRING MOUNTING
Filed Aug. 7, 1933     5 Sheets-Sheet 1
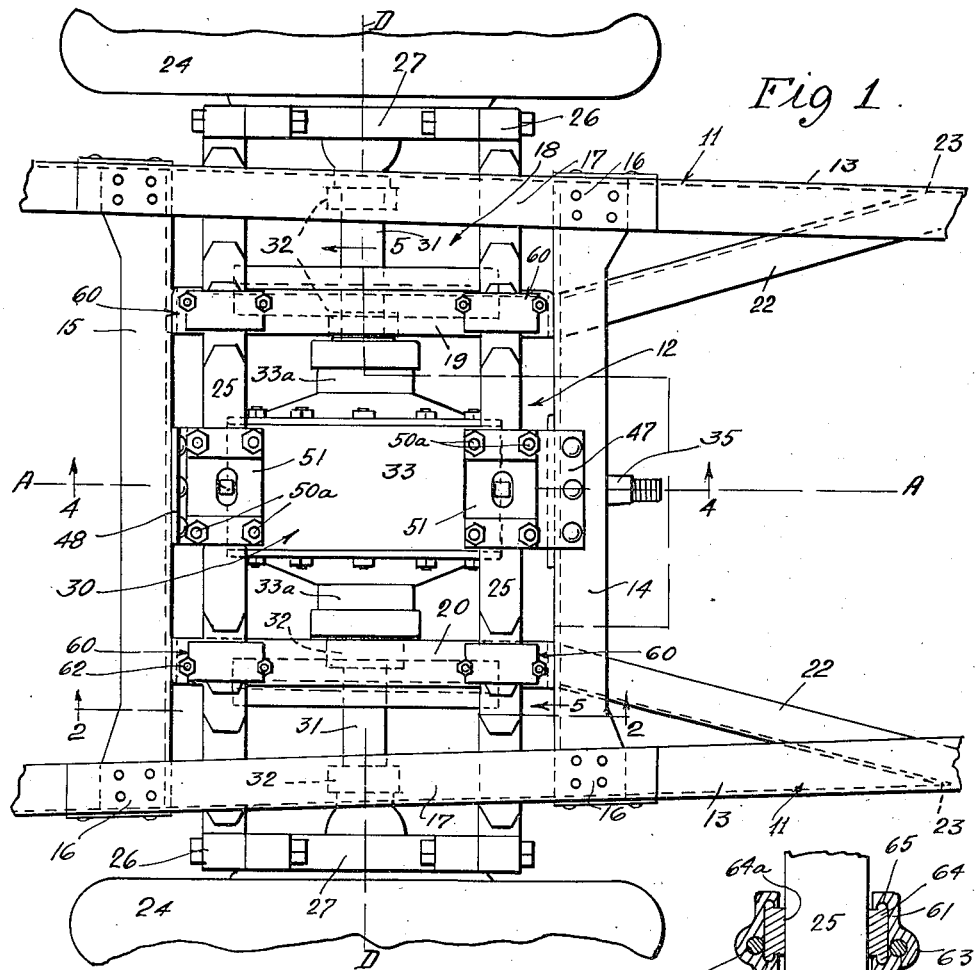
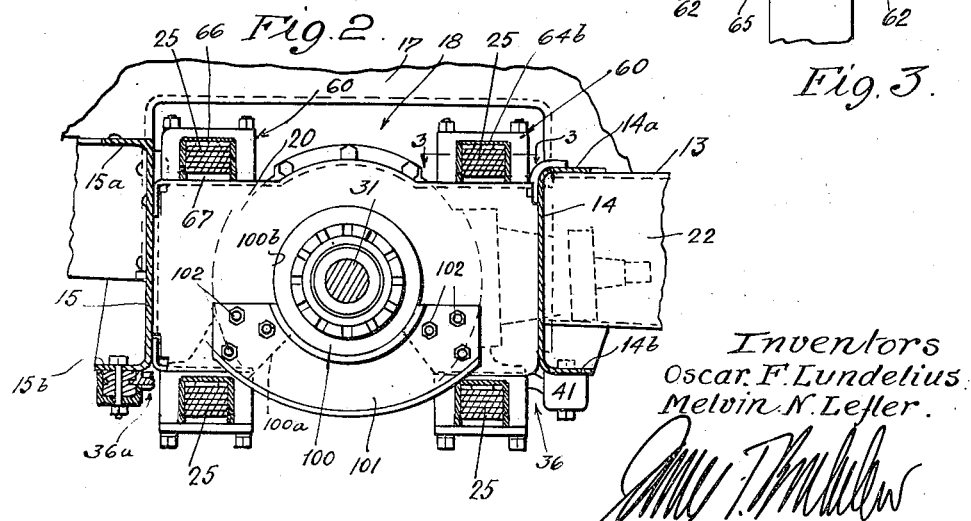
Inventors
Oscar F. Lundelius
Melvin N. Lefler
Attorney

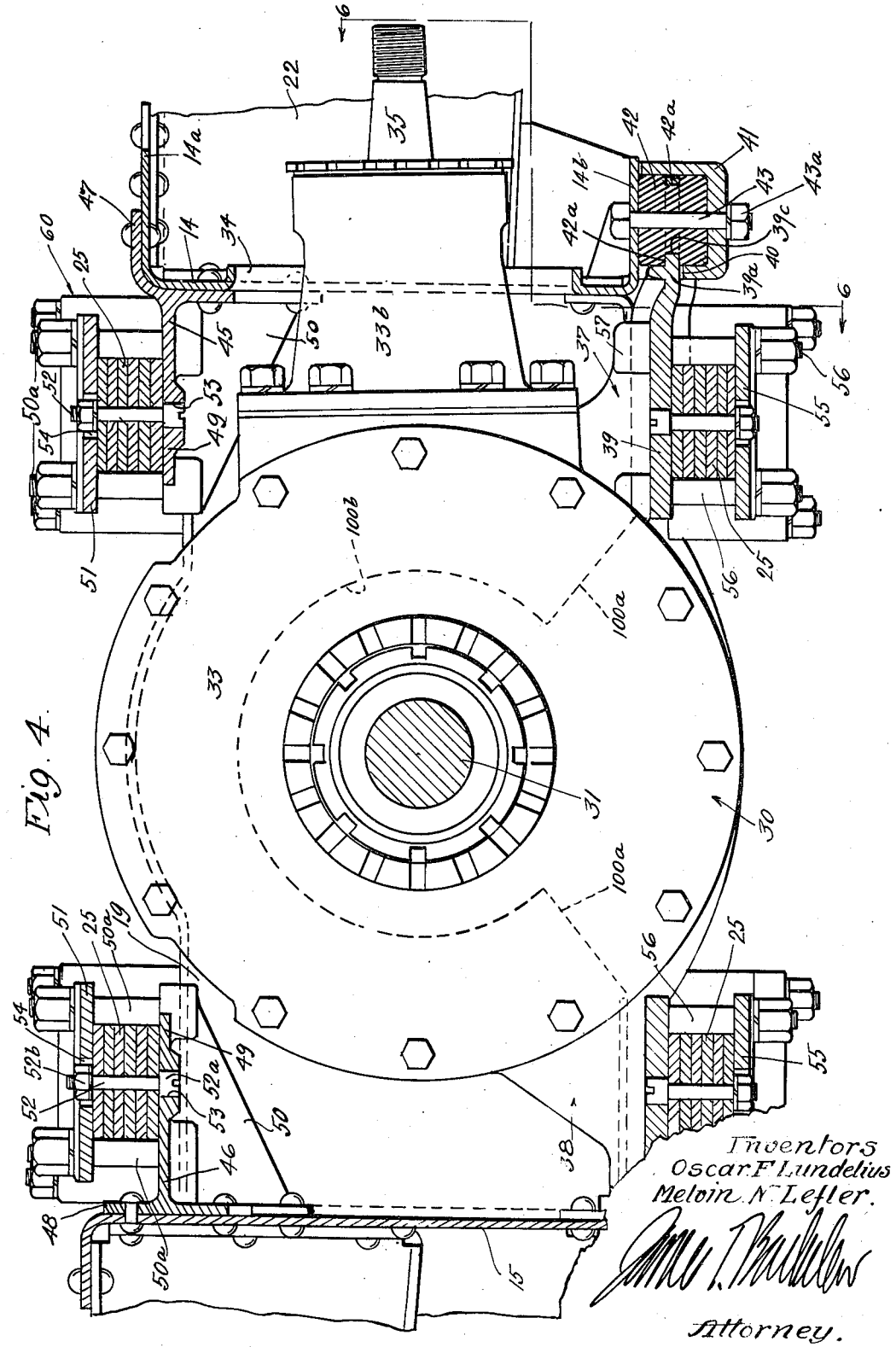

Dec. 24, 1935.   O. F. LUNDELIUS ET AL   2,025,669
DIFFERENTIAL AND SPRING MOUNTING
Filed Aug. 7, 1933   5 Sheets-Sheet 3
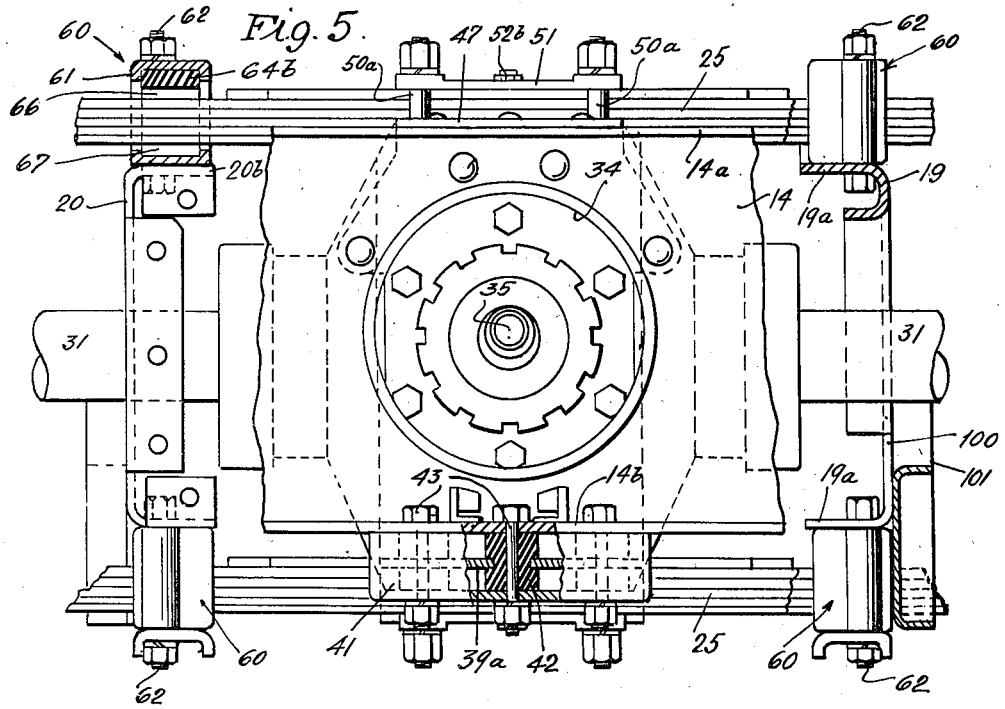
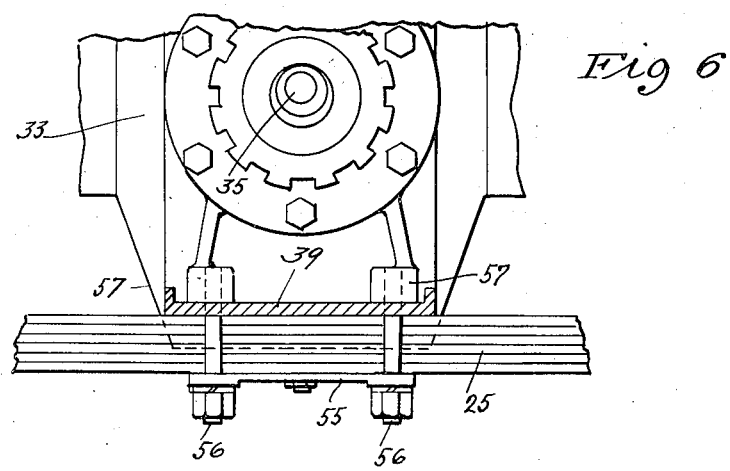
Inventors
Oscar F. Lundelius
Melvin N. Lefler
Attorney.

Dec. 24, 1935.  O. F. LUNDELIUS ET AL  2,025,669
DIFFERENTIAL AND SPRING MOUNTING
Filed Aug. 7, 1933   5 Sheets-Sheet 4
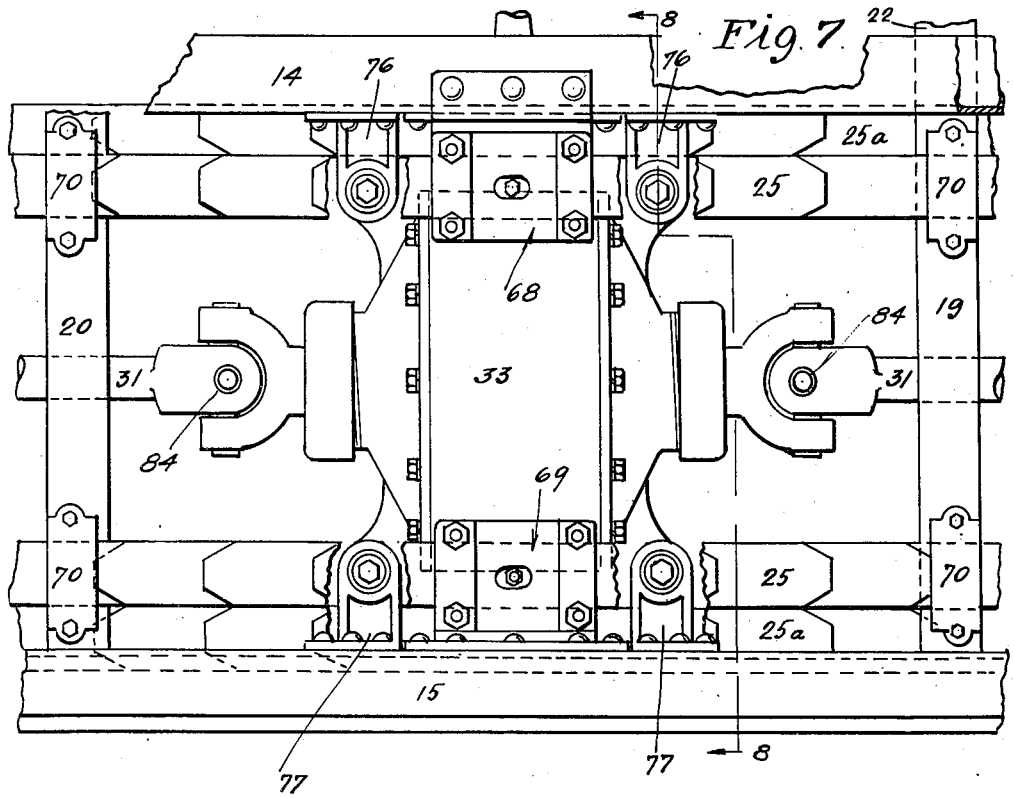
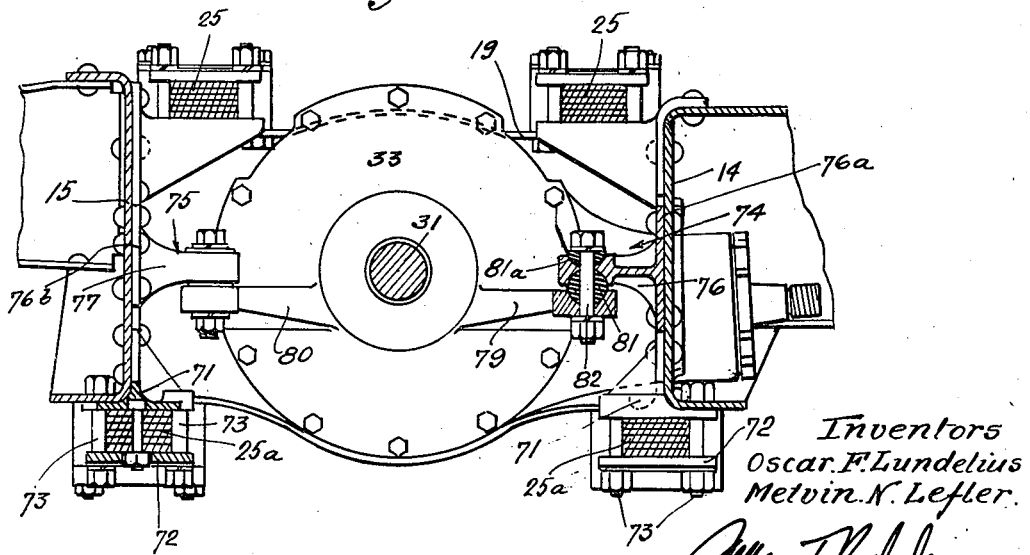
Inventors
Oscar F. Lundelius
Melvin N. Lefler
Attorney Dec. 24, 1935.  O. F. LUNDELIUS ET AL  2,025,669
DIFFERENTIAL AND SPRING MOUNTING
Filed Aug. 7, 1933   5 Sheets-Sheet 5
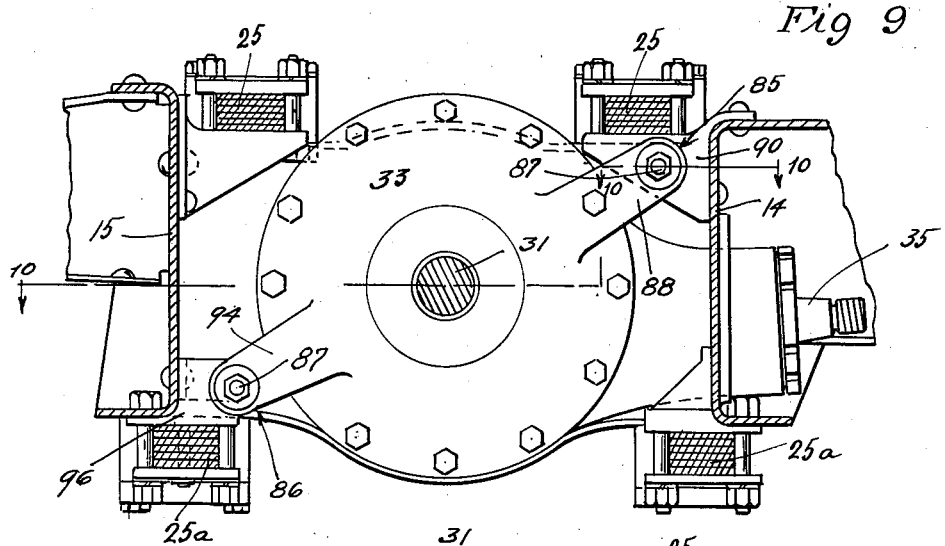
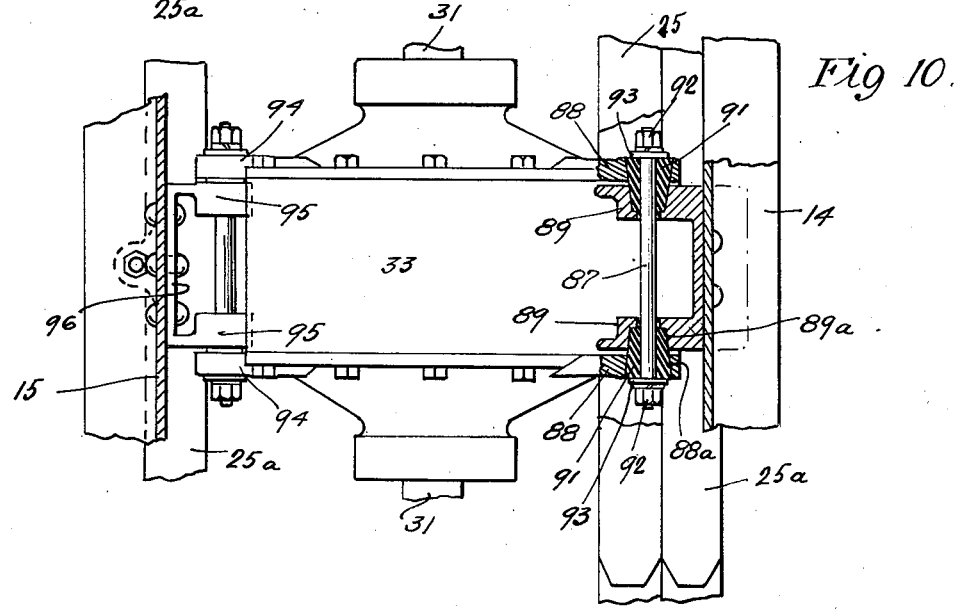
Inventors
Oscar F. Lundelius
Melvin N. Lefler
Attorney.

Patented Dec. 24, 1935

2,025,669

UNITED STATES PATENT OFFICE 2,025,669

DIFFERENTIAL AND SPRING MOUNTING

Oscar F. Lundelius and Melvin N. Lefler, Los Angeles, Calif., assignors to Lundelius & Eccleston Motors Corporation, Los Angeles, Calif., a corporation of Delaware Application August 7, 1933, Serial No. 683,926

24 Claims. (Cl. 180—73)

This invention has to do with improvements in vehicle chassis construction and principally with differential and rear spring assemblies. These improvements have been especially designed for spring supported vehicles of the type in which the frame is connected with the wheels by way of transverse springs, instead of through the ordinary rigid axle assemblies; and the invention may be regarded as having its preferred embodiment in vehicles of this spring supported type. Certain features of the invention however need not be limited in their application to any particular type of spring arrangement. The claims, therefore, unless expressly so limited, should be interpreted accordingly.

One of the principal objects of the invention is to provide improvements in differential and spring assemblies of the general character disclosed in Patent No. 1,814,256, granted July 14, 1931, to O. F. Lundelius et al., on Vehicle chassis. In the patented structure, the differential is shown to be rigidly connected to the frame and the springs to be carried in rubber mountings connected to the frame and differential at opposite sides of the longitudinal centers of the springs. The principal distinction and improvement in the present differential mounting over that disclosed in the patent, resides in the provision of sound deadening supports for the differential, these supports consisting, preferably, of rubber pads interposed between the differential and the frame. As will be seen from the drawings to which we later refer, the invention contemplates the use of a variety of types of mountings coming within this general description.

Although, broadly speaking, the differential mounting is independent of any particular arrangement or mounting of the springs, we have included in the differential and rear spring assembly, a preferred form of spring mounting in conjunction with the frame parts supporting the differential. In this assembly, the springs are rigidly clamped to the frame at their longitudinal centers, the spring supporting frame members preferably being the same frame members which support the differential. As an adjunct to this particular type of spring mounting, we also provide spring overload taking means in the form of rubber cushion elements located at opposite sides of the longitudinal center of the spring and connected with the frame.

In our copending application entitled Vehicle spring and differential mounting, Ser. No. 683,929, filed on even date herewith, we show another differential mounting similar in many respects with the forms described herein, but differing as to the general arrangement of the cushion supports. In our said copending application, we also show another type of spring mounting in conjunction with the differential mounting.

The above and additional objects and characteristics of the invention will be understood most readily and to best advantage, from the following detailed description of certain typical and preferred forms of the invention. Throughout the description reference is had to the accompanying drawings, in which:

Figure 1 is a plan view showing the differential and rear spring assembly;

Fig. 2 is a sectional end elevation on line 2—2 of Fig. 1;

Fig. 3 is a fragmentary enlarged section through one of the spring overload taking bosses, as indicated by line 3—3 of Fig. 2;

Fig. 4 is a longitudinal center section on line 4—4 of Fig. 1;

Fig. 5 is a transverse view in part section and elevation taken on broken line 5—5 of Fig. 1, certain of the parts being broken away to more clearly show the construction;

Fig. 6 is a reduced scale fragmentary view on broken line 6—6 of Fig. 4, and showing the differential casing partly in front end elevation;

Fig. 7 is a view similar to Fig. 1, showing a variational form of the invention;

Fig. 8 is a section on broken line 8—8 of Fig. 7;

Fig. 9 is a side elevation, generally similar to Figs. 2 and 8, but showing a further variational form of differential mounting; and Fig. 10 is a plan view, partly in section, taken on line 10—10 of Fig. 9.

Referring first to Figs. 1 and 2, the vehicle frame, generally indicated at 11, to which the differential and rear spring assembly 12 is connected, may be of any suitable construction, although the illustrated form is preferred. The frame comprises a pair of longitudinally extending side rails 13 which are interconnected by a forward transverse member 14 riveted to the side rails at 16, member 14, as shown best in Figs. 2 and 4, having upper and lower flanges 14a and 14b projecting forwardly of the frame. Kick up sills 17 connect with the side rails 13 and bridge the space 18 between transverse member 14 and a rear transverse member 15 having flanges 15a and 15b, the kick up sills being vertically offset to permit wide range of vertical flexure of the spring assembly, hereinafter described.

Longitudinal frame members 19 and 20, hereinafter termed subrails, extend between and connect with the transverse members 14 and 15, the subrails and transverse members being symmetrically arranged in plan, with reference to the longitudinal axial line A—A of the frame and the vertical axial plane of the differential indicated by line D—D. Line A—A also indicates the transverse center line of the differential. Frame members 22, which may either connect with the subrails by way of transverse member 14, or constitute continuations of the subrails, diverge forwardly of the frame and connect at 23 with the side rails at longitudinally intermediate points. Frame members 22 serve primarily as braces which transmit stresses applied to the transverse members and subrails in a direction longitudinally of the frame, to the side rails. This feature of frame construction is broadly covered in the patent to Lundelius, et al., to which reference is hereinabove made.

The frame is connected with the rear wheels 24 by way of transverse springs 25, herein typically shown as comprising two vertically spaced and symmetrically arranged pairs of springs mounted on the subrails and differential casing, respectively, as will be more fully explained later. The ends of the springs have pivotal connections at 26 with wheel carriers 27. The wheels 24 are driven from the differential 30 by way of drive shafts 31 in which are interposed universal joints diagrammatically indicated at 32. The details of the connections between the wheels, springs, wheel carriers 27 and the drive shafts, comprise no part of this invention and will require no further description.

The differential 30 is shown to comprise a casing 33 having laterally projecting hub portions 33a, and (see Fig. 4) a pinion housing 33b projecting forwardly of the frame through a central opening 34 in transverse frame member 14. The pinion shaft 35, projecting from the pinion housing 33b, connects with the main drive shaft (not shown). It may be mentioned at this point that sufficient annular clearance is provided between the pinion housing and the wall of opening 34 to permit the differential to be simultaneously swung downwardly and backed out of the opening, when it is desired to disconnect the differential from the frame and after the lower springs have been disconnected from the differential casing.

We have provided an improved differential support in which the differential is yieldably connected with the frame in such manner that shocks and vibrations normally transmitted from the differential to the frame are largely absorbed in the cushion supports. Equally important, the mountings prevent or deaden the transmission of sounds. The advantages of this type of mounting in avoiding the transmission of sounds, shocks and vibrations from the differential to the frame, will be readily apparent in view of the commonly known desirability for minimizing vibrations and impact stresses in vehicle frames. In accordance with our present preferred form of the invention, we mount the differential on rubber cushion supports located at points spaced longitudinally and transversely of the frame, and in such manner that the differential will not only be cushioned as against vertical movement relative to the frame, but also against oscillatory movement that may be imparted to the differential from the main drive shaft.

The differential mountings comprise supports 36 and 36a, located toward the front and rear, respectively, of the lower portion of the differential casing. As shown most clearly in Figs. 4 to 6, arms generally indicated at 37 and 38, project forwardly and rearwardly of the frame from the lower portion of the casing. Each of these arms comprises a transversely extending plate 39 having an apertured end portion 39a, see Fig. 5, projecting beneath the bottom flanges 14b and 15b of the transverse frame members. The end portion of plate 39 projects through opening 40 in the rear wall of cushion supporting housing or channel 41, which may contain one or more rubber cushions 42 inserted within apertures 39c of arms 39a, the cushions having grooves 42a which receive the portions of the plate surrounding the apertures. The cushions may be cast within apertures 39c or made sufficiently contractible, radially, to permit their insertion within the apertures. Each channel 41 and the rubber cushions 42 are held in place and clamped to the underside of the bottom flange of the transverse frame member, by bolts 43 extending centrally through each of the cushions, nuts 43a on the bolts being taken up sufficiently to vertically compress the rubber cushions to a suitable extent. Sufficient clearance is maintained between channel 41 and the forward edge of plate 39 to permit slight movement of the differential longitudinally of the frame without producing metal to metal contact. While the rear differential support 36a is not shown in Fig. 4, its construction will be understood from inspection of Fig. 2 to be similar to the forward support which appears in detail.

Cushions 42, being interposed between the differential and the frame, yieldably resist relative movement between the differential and the frame, and largely absorb shocks imparted to the differential that ordinarily would be transmitted to the frame in constructions where the latter is rigidly connected to the differential. The supports 36 and 36a not only cushion the differential against downward as well as upward movement relative to the frame, but they also provide yielding resistance to oscillatory movement of the differential about its axis.

The springs 25 are offset, relative to the transverse frame members 14 and 15, toward the vertical axial plane of the differential, the upper springs being mounted at their longitudinal centers upon supports connecting to the transverse frame members, and the lower springs being connected with the differential. As shown most clearly in Figs. 1 and 4, the upper springs are mounted on supports 45 and 46 attached at 47 and 48 to the forward and rear transverse frame members, respectively, and projecting inwardly toward the differential. Each of the supports comprises a flat surface plate 49 having an integral reenforcing web 50, and carrying two pairs of stud bolts 50a between which the spring extends. The spring is tightly clamped in its center by strap plate 51 which bears against the top surface of the spring, bolts 50a extending through the clamping plate. Head 52a and nut 52b of the spring center bolt 52 are received within openings 53 and 54 in the support 49 and clamping plate 51, respectively.

The lower springs are similarly clamped at their longitudinal centers to the previously described plates 39 which are integral with the differential casing. The lower spring mountings are similar to those described above, the springs being clamped between plates 39 and 55 by means of stud bolts 56 terminating in bosses 57, see Fig. 6, on the differential casing.

Overload stresses on the springs are taken by snubbers, generally indicated at 60, located at predetermined equal distances at each side of the central mounting of the springs. The snubbers preferably comprise rubber cushions normally spaced from the springs, but engageable by the latter upon predetermined spring flexure, to take the overload and snub the springs against excessive deflection. As shown most clearly in Figs. 2, 3 and 5, the overload snubbers comprise boxes 61, placed over the springs and attached to subrails 19 and 20 by bolts 62 extending through offset bosses 63 in the boxes and inwardly projecting flanges 19a and 20b of the subrails. Boxes 61 are lined with rubber cushions 64 carried within undercut grooves 65, the side portions 64a of the cushions engaging the sides of the spring, and the intermediate portions 64b being spaced at 66 from the top surface of the springs. Preferably, spaces 67 will be provided within the snubber boxes below as well as above the springs, to allow free flexure of the springs, within the limits permitted by the snubber boxes, in both directions.

Under normal conditions, that is when the wheels pass over normal road irregularities, the springs are permitted free flexure from their center mountings, within the range permitted by the clearance spaces at 66 within the snubber boxes. As abnormal road irregularities are encountered, resulting in relatively extreme spring flexure, the springs come into engagement with the cushions 64b, which, as stated above, take the overload and produce an effective snubbing action. However, by reason of the yielding characteristics of the overload taking cushions, a smooth snubbing action is effected, and the transmission of sharp impact to the frame is avoided.

The overload snubber boxes also maintain the springs against transverse movement, and in so doing minimize the driving torque reaction on the center mounting of the spring. The central portions of subrails 19 and 20, see Fig. 2, are cut away to provide openings 100 through which the drive shafts 31 extend. Each opening 100 is defined by edges 100a of the subrail extending inwardly from the lower spring mountings, and a circular edge 100b having its center substantially coincident with the axis of the differential. The lower portion of opening 100 is bridged across by channel plate 101 bolted at 102 to the subrail, plate 101 serving as a reinforcement for the lower portion of the subrail. Where removability of the bridge plates is of no importance, they may, in effect, be formed integrally with the subrails. Bridge plates 101 may be disconnected whenever found desirable in assembling or disassembling the parts, by removing bolts 102. While for some purposes we may prefer to use separately formed bridge plates 101, it will be understood that we may in other instances omit them altogether, leaving openings 100 unbridged at the bottom.

In order to disconnect the differential from the frame, universal joints 32 are first broken, lower springs 25 disconnected from their mountings and overload snubbers 60 for the lower springs removed. Bolts 43 may then be removed to disconnect the forward and rear differential mountings, and the differential then simultaneously dropped and turned so as to back the pinion housing 33b out of opening 34 in the forward transverse frame member, the spacing between the transverse members 14 and 15 being sufficient to provide ample clearance for the differential to be dropped between them.

In Figs. 7 and 8, we show a variational form of the invention having upper spring mountings 68 and 69 and overload snubbers 70 similar to the corresponding parts in the previously described form, but differing with respect to the differential and lower spring mountings. Here the lower springs 25a are offset longitudinally of the frame with relation to the upper springs, and are attached to supports 71 having their centers, transversely of the springs, at substantially the inner faces of the transverse frame members 14 and 15. Springs 25a are clamped between supports 71 and plates 72 by bolts 73.

The differential supports, generally indicated at 74 and 75, comprise pairs of arms 76 and 77 attached at 76a, 76b, to frame members 14 and 15, respectively, the arms being positioned in substantially the horizontal axial plane of the differential. These frame supported arms connect with pairs of arms 79 and 80 formed integrally with the differential casing and projecting forwardly and rearwardly from opposite sides thereof. As in the first described form of the invention, cushion elements are interposed between the differential and the frame, the cushions in the present form comprising spherical shaped rubber bushings 81 and 81a seated within recesses in the differential and frame supported arms. The latter are connected by bolts 82 extending centrally through the rubber bushing, the bolt nuts being taken up sufficiently to compress the rubber elements to the extent required to maintain a tight, or at least snug joint between the parts.

This type of differential support is particularly advantageous by reason of the ease which it affords in permitting removal of the differential. For the purpose of removing the differential from the chassis, it is only necessary to disconnect the universal joints at 84, remove bolts 82, and swing the differential downwardly, backing it out of the opening 34 in the forward transverse frame member 14. The spacing between the lower spring support 71 preferably is so regulated as to just provide ample clearance to permit the differential to be dropped.

The further variational form of the invention illustrated in Figs. 9 and 10 is generally similar to that shown in Figs. 7 and 8, except as to certain modifications in the differential supports. In the last illustrated embodiment, the forward and rear differential supports 85 and 86 are located respectively above and below the horizontal axial plane of the differential. The forward support 85 comprises a bolt 87 extending through differential casing arms 88 and web portions 89 of the upper forward spring mounting 90. Bolt 87 extends through tapered rubber bushings 91 inserted within correspondingly shaped bores 88a and 89a in the differential casing arms and spring support web portions, as illustrated. Nuts 92 are brought to bear against washers 93 to the extent of snugly compressing the bushings in an axial direction. Similar rubber bushings are inserted between the differential arms 94 and web portions 95 of rear lower spring support 96 of the lower differential mounting 86.

This type of differential mounting has the same advantage with respect to the facility with which the differential may be removed from the chassis, as the previously described form of Figs. 7 and 8. After the wheel drive shafts have been disconnected, the differential may be dropped between the lower spring mountings simply by removing bolts 87 and rubber bushings 91. It will be observed that the differential mountings 85 and 86, and this applies as well to mountings 74 and 75 of the form shown in Fig. 8, though positioned differently than the differential supports shown in the first described form of the invention, possess similar characteristics insofar as their abilities to cushion the differential and prevent the transmission of vibrations and shocks to the frame are concerned.

While the above described differential and rear spring assemblies may be regarded as typical and preferred forms of the invention, it is to be understood that in its broad aspects, the invention is not limited to the particular constructions herein shown and described, but instead contemplates all modifications and variations as may come within the scope of the appended claims.

We claim:

1. In a vehicle of the character described, the combination comprising a frame having a pair of transversely extending members spaced longitudinally of the frame, a differential positioned between said members, a pair of yieldable supports connecting the forward and rear portions of the differential with said members, and a pair of transversely extending springs mounted on said members.

2. In a vehicle of the character described, the combination comprising a frame having a pair of transversely extending members spaced longitudinally of the frame, a differential positioned between said members, a pair of yieldable supports connecting the forward and rear portions of the differential with said members, and a pair of transversely extending springs mounted on said members and offset relative thereto toward the transverse vertical axial plane of the differential.

3. In a vehicle of the character described, the combination comprising a frame having a pair of transversely extending members spaced longitudinally of the frame, a differential positioned between said members, and a pair of yieldable supports connecting the forward and rear portions of the differential with said members, a pair of transversely extending springs, and spring supports mounted on said members and clamping said springs at their longitudinal centers.

4. In a vehicle of the character described, the combination comprising a frame having a pair of transversely extending members spaced longitudinally of the frame, a differential positioned between said members, and a pair of yieldable supports connecting the forward and rear portions of the differential with said members, a pair of transversely extending springs, and spring supports mounted on said members and clamping said springs at their longitudinal centers, said springs being offset relative to said members toward the transverse vertical axial plane of the differential.

5. In a vehicle of the character described, the combination comprising a frame having a pair of transversely extending members spaced longitudinally of the frame, a differential positioned between said members, and a pair of yieldable supports connecting the forward and rear portions of the differential with said members, and two pairs of vertically spaced and transversely extending springs mounted on said members.

6. In a vehicle of the character described, the combination comprising a frame having a pair of transversely extending members spaced longitudinally of the frame, a differential positioned between said members, and a pair of yieldable supports connecting the forward and rear portions of the differential with said members, two pairs of vertically spaced and transversely extending springs, and individual spring supports mounted on said members and clamping said springs at their longitudinal centers.

7. In a vehicle of the character described, the combination comprising a frame having a pair of transversely extending members spaced longitudinally of the frame, a differential positioned between said members, and a pair of yieldable supports connecting the forward and rear portions of the differential with said members, two pairs of vertically spaced and transversely extending springs, and means for supporting said springs on said members, said springs being offset from said members toward the transverse vertical axial plane of the differential.

8. In a vehicle of the character described, the combination comprising a frame, a differential, and a yieldable support connecting said differential with the frame, a transversely extending spring, means for clamping said spring at its longitudinal center, to the frame, said clamping means being substantially in alinement with the transverse center of the differential, and spring overload taking means mounted on the frame at opposite sides of said clamping means and at opposite sides of the differential.

9. In a vehicle of the character described, the combination comprising a frame, a differential, and a yieldable support connecting said differential with the frame, a transversely extending spring, means for clamping said spring at its longitudinal center, to the frame, said clamping means being substantially in alinement with the transverse center of the differential, and spring overload taking cushions mounted on the frame at opposite sides of said clamping means and at opposite sides of the differential.

10. In a vehicle of the character described, a frame which includes a pair of spaced longitudinally extending members, a spring extending transversely across said members, a support mounted on the frame and clamping said spring at its longitudinal center, and spring overload taking means mounted on said members, said means comprising rubber elements adapted to be compressed by the spring upon predetermined spring flexure.

11. In a vehicle of the character described, a frame comprising a pair of spaced transversely extending members and a pair of spaced longitudinally extending members, a differential mounted on said transverse members, rubber cushions supporting the differential, a transversely extending spring, a support mounted on the frame and clamping said spring at its longitudinal center and substantially in alinement with the transverse center of the differential, and spring overload taking means mounted on said longitudinal frame members at opposite sides of the differential.

12. In a vehicle of the character described, a frame, a spring extending transversely of the frame, a support mounted on the frame and clamping said spring at its longitudinal center, and a pair of overload taking devices engageable by said spring upon flexure and positioned at opposite sides of said support, each of said overload taking devices comprising a metallic housing and a cushion confined within said housing, said cushion normally being out of engagement with the spring but adapted to be engaged by the spring upon predetermined spring flexure.

13. In a vehicle of the character described, a frame, a spring extending transversely of the frame, a support mounted on the frame and clamping said spring at its longitudinal center, and overload taking cushions engageable by said spring upon flexure and positioned at opposite sides of said support, said cushions comprising rubber elements confined within metallic housings and normally disengaged from the spring.

14. In a vehicle of the character described, the combination comprising a frame having spaced transverse members and longitudinal rails connecting said transverse members, a differential positioned between said transverse members and between the longitudinal rails, means connecting said differential with the frame, a spring support mounted on and projecting from one of said transverse members toward the differential, and a transverse spring offset relative to the last mentioned transverse member and carried on said support.

15. In a vehicle of the character described, the combination comprising a frame having spaced transverse members and longitudinal rails connecting said transverse members, a differential positioned between said transverse members and between the longitudinal rails, means connecting said differential with the frame, a spring support positioned between said rails and mounted on and projecting from one of said transverse members toward the differential, and a transverse spring offset relative to the last mentioned transverse member and attached at its longitudinal center to said support.

16. In a vehicle of the character described, the combination comprising a frame having spaced transverse members and longitudinal rails connecting said transverse members, a differential positioned between said transverse members, means connecting said differential with the frame, a spring support mounted on and projecting from one of said transverse members toward the differential, a transverse spring offset relative to the last mentioned transverse member and attached at its longitudinal center to said support, and spring overload taking means mounted on said longitudinal rails at opposite sides of the longitudinal center of said spring.

17. In a vehicle of the character described, the combination comprising a frame having spaced transverse members and longitudinal rails connecting said transverse members, a differential positioned between said transverse members and between the longitudinal rails, a spring support mounted on and projecting from one of said transverse members toward the differential, a transverse spring offset relative to the last mentioned transverse member and carried on said support, and means connecting said differential with the transverse member on which the spring support is mounted, at a point below said spring.

18. In a vehicle of the character described, the combination comprising a frame having spaced transverse members and longitudinal rails connecting said transverse members, a differential positioned between said transverse members, a spring support mounted on and projecting from one of said transverse members toward the differential, a transverse spring offset relative to the last mentioned transverse member and carried on said support, and means connecting said differential with the transverse member on which the spring support is mounted, at a point below said spring, the last mentioned means including a yieldable differential supporting element.

19. In a vehicle of the character described, the combination comprising a frame having a pair of transversely extending members spaced longitudinally of the frame, a differential positioned between said members, means connecting the forward and rear portions of the differential casing with said members and serving to connect said members through the differential casing, and a transversely extending spring clamped at its longitudinal center to one of said members and offset relative thereto toward the transverse vertical axial plane of the differential.

20. In a vehicle of the character described, the combination comprising a frame having a pair of transversely extending members spaced longitudinally of the frame, a differential positioned between said members, means connecting the forward and rear portions of the differential casing with said members and serving to connect said members through the differential casing, a pair of transversely extending springs, and separate spring supports mounted on and projecting centrally from said members and clamping said springs at their longitudinal centers, said springs being offset relative to said members toward the transverse vertical axial plane of the differential.

21. In a vehicle of the character described, the combination comprising a frame, a differential, means connecting said differential with the frame, a transversely extending spring, means for clamping said spring at its longitudinal center, to the frame, said clamping means being substantially in alinement with the transverse center of the differential, and spring overload taking means mounted on the frame at opposite sides of said clamping means and at opposite sides of the differential.

22. In a vehicle of the character described, the combination comprising a frame, a differential, means connecting said differential with the frame, a transversely extending spring, means for clamping said spring at its longitudinal center, to the frame, said clamping means being substantially in alinement with the transverse center of the differential, and spring overload taking cushions mounted on the frame at opposite sides of said clamping means and at opposite sides of the differential.

23. In a vehicle of the character described, a frame which includes a pair of spaced longitudinally extending members, a spring extending transversely across said members, a support mounted on the frame and clamping said spring at its longitudinal center, and spring overload taking means mounted on said members, said spring overload taking means comprising a metallic housing and a cushion within said housing, said cushion normally being out of engagement with the spring but adapted to be engaged by the spring upon predetermined spring flexure.

24. In a vehicle of the character described, a frame which includes a pair of spaced longitudinally extending members, a spring extending transversely across said members, a spring clamp mounted on the frame and attaching said spring at substantially its longitudinal center rigidly to the frame, and spring overload taking means embracing the spring and mounted on said members, said overload taking means comprising a pair of yieldable members mounted at opposite sides of the spring center and in substantially horizontal alinement with said clamp, said members being compressible by the spring upon predetermined spring flexure.

OSCAR F. LUNDELIUS.
MELVIN N. LEFLER.